No. 721,401. PATENTED FEB. 24, 1903.
C. UPTON.
VARIABLE SPEED GEARING.
APPLICATION FILED DEC. 27, 1899.
NO MODEL. 2 SHEETS—SHEET 1.
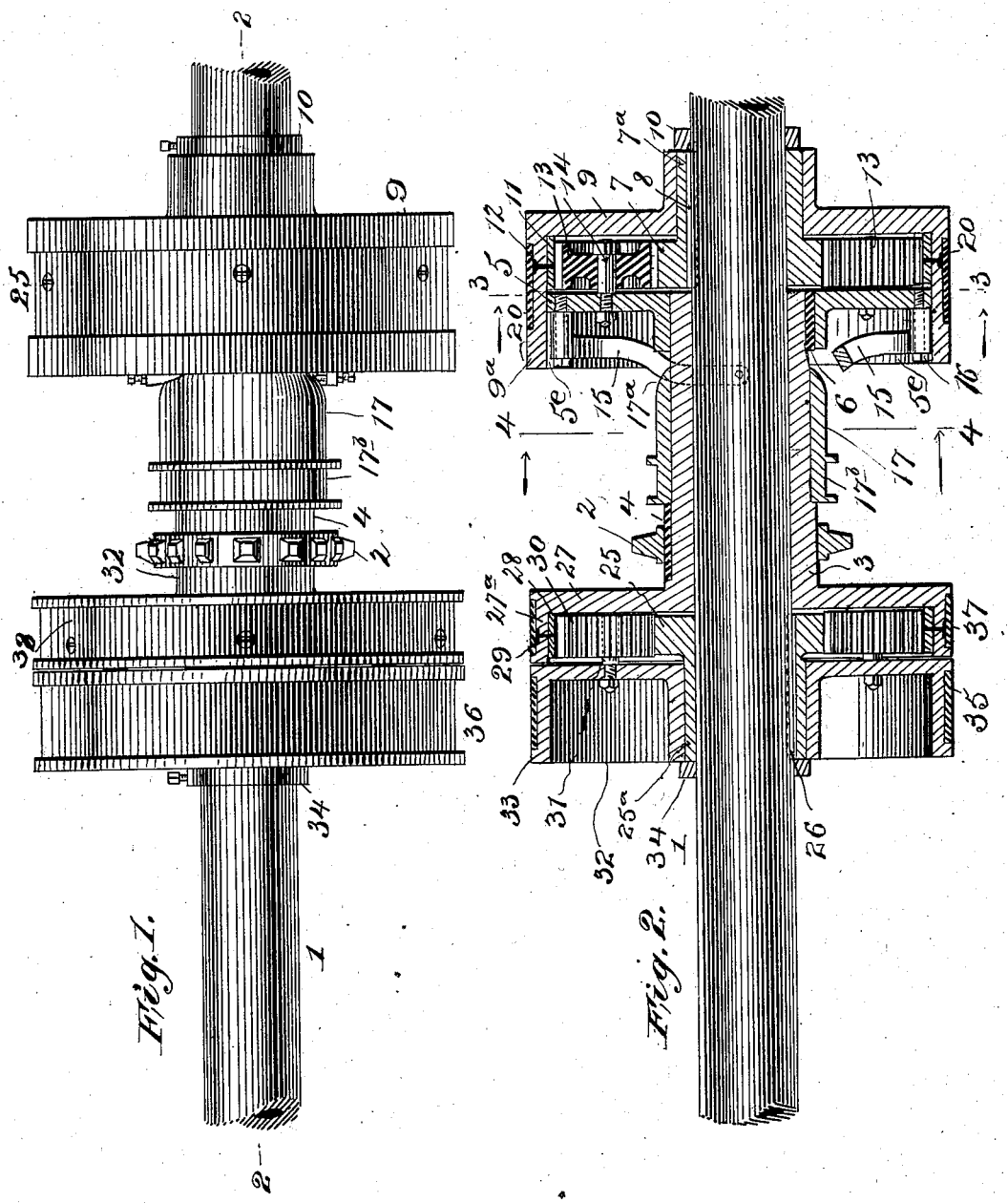
Witnesses;
C. W. Benjamin
F. E. Turner
Inventor;
Colcord Upton
by T. F. Bourne
his atty

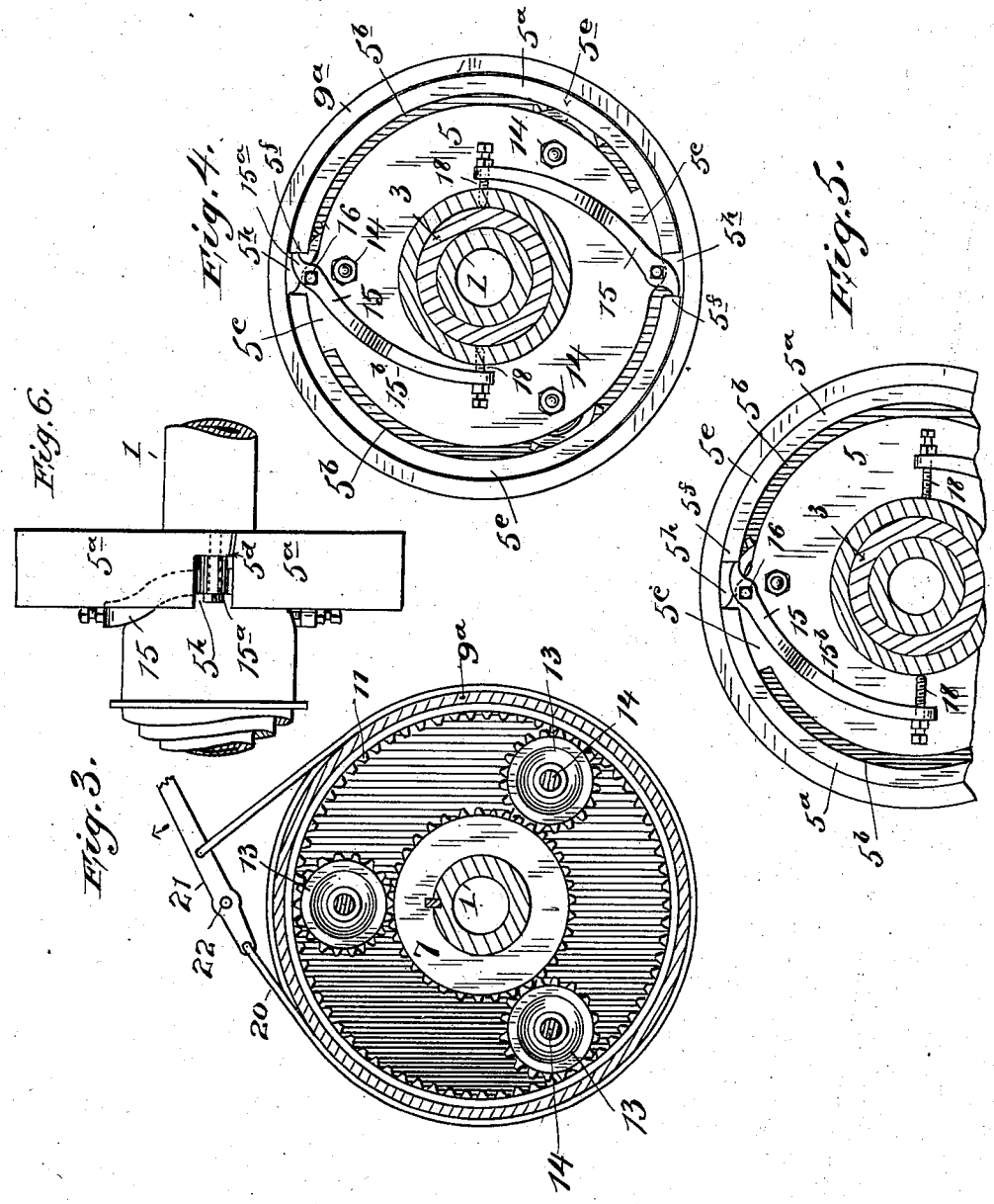

UNITED STATES PATENT OFFICE.

COLCORD UPTON, OF BEVERLY, MASSACHUSETTS, ASSIGNOR TO UPTON MACHINE COMPANY, A CORPORATION OF NEW YORK.

VARIABLE-SPEED GEARING.

SPECIFICATION forming part of Letters Patent No. 721,401, dated February 24, 1903.

Application filed December 27, 1899. Serial No. 741,715. (No model.)

*To all whom it may concern:*

Be it known that I, COLCORD UPTON, a citizen of the United States, residing at Beverly, county of Essex, State of Massachusetts, have invented certain new and useful Improvements in Variable-Speed Gearing, of which the following is a specification.

The object of my invention is to provide a simple, efficient, and durable gearing whereby variable speeds may be transmitted from a relatively constant speed source of power.

In carrying out my invention I provide a driving part which may be rotated by any suitable means, a driven part, and means intermediate the driven and the driving parts whereby the driven part may be rotated at a high or low speed in one direction and at a low speed in the reverse direction.

The invention consists in the novel details of improvement that will be more fully hereinafter set forth, and then pointed out in the claims.

Reference is to be had to the accompanying drawings, forming part hereof, wherein—

Figure 1 is a side elevation of a variable-speed gearing embodying my invention. Fig. 2 is a longitudinal section thereof substantially on the line 2 2 in Fig. 1. Fig. 3 is a cross-section on the plane of the line 3 3 in Fig. 2. Fig. 4 is a cross-section on the line 4 4 in Fig. 2, showing friction devices. Fig. 5 is a detail view similar to Fig. 4, showing the friction devices in the operative position; and Fig. 6 is a detail edge view of the friction devices.

In the accompanying drawings, in which similar numerals of reference indicate corresponding parts in the several views, 1 indicates a driving part, (shown in the form of a shaft,) which may be mounted in any suitable bearings (not shown) and which may be rotated from any suitable source of power— such, for instance, as a motor, engine, or the like—not necessary to be shown, and said shaft may be coupled direct to the main driving-shaft of such motor or engine or through the medium of any suitable gearing or other connection.

2 is a part to be driven by the driving part or shaft 1, and the part 2 is shown in the form of a sprocket-wheel mounted to rotate around the shaft 1, although the part 2 may be a gear, pulley, or other suitable power-transmitting element.

3 is a sleeve, hub, or hollow shaft mounted to rotate freely upon shaft 1, and the wheel or driven part 2 is shown mounted upon the sleeve or hub 3 and secured thereto, so as to rotate therewith, being shown connected therewith by a key 4, although any suitable means may be provided for this purpose. The sleeve or hub 3 is provided with a disk or extension 5, which is shown as made separate from the sleeve or hub 3 and secured thereon to rotate therewith, as by means of a key 6.

7 is a gear secured upon the shaft 1, as by a key 8, and the gear 7 is shown provided with a hub $7^a$, upon which a drum or flanged disk 9 is mounted to rotate, the rim $9^a$ being shown extending substantially parallel with shaft 1. A collar 10, secured upon shaft 1, serves to keep the drum 9 in the proper position relatively to gear 7.

11 is an annular rack secured to the rim $9^a$ of drum 9, as by means of screws or the like 12, and 13 are pinions located between gear 7 and rack 11 and in mesh therewith. (See Fig. 3.) The pinions 13 are mounted to rotate upon studs or shafts 14, secured to and projecting from the disk or extension 5, and the latter is shown located within the drum 9, the rim $9^a$ thereof surrounding said disk. The arrangement is such that when the disk 5 is locked to the drum 9 the gear 7, through the medium of pinion 13 and rack 11, will carry the drum 9, sleeve 3, and wheel 2 around at the same speed as shaft 1; but when the drum 9 is held from rotation and the disk 5 is not in engagement with said drum the rotation of shaft 1 and gear 7 will cause pinion 13 to travel around rack 11, and thus rotate disk 5, thereby transmitting rotary motion to sleeve 3 and wheel 2, but at a slower speed than shaft 1. Any suitable means may be provided for firmly connecting the disk or extension 5 with the drum 9 or the rim $9^a$. I preferably provide friction devices for the purpose, which may be mounted in any suitable manner that will accomplish the object stated.

The friction devices I have shown are arranged as follows: I first provide disk 5 with an integral annular flange 5ª, projecting from one face thereof, and I make two annular cuts 5ᵇ through the disk directly under the flange, each cut being less than a semicircle, leaving an uncut part of the disk 5ᶜ at diametrically opposite sides thereof, and I cut the flange 5ª transversely, as at 5ᵈ, (see Fig. 6,) at diametrically-opposite sides of the disk, whereby friction-arms 5ᵉ are formed to lie freely within the rim 9ª of drum 9. (See Figs. 4 and 5.) 15 are levers pivotally connected with disk 5, as by pivots or the like 16 secured to said disk, and one end 15ª of the lever 15 projects into the space 5ʰ and against the end 5ᶠ of the friction-arm 5ᵉ, so as to press the latter outwardly, and the arm 15ᵇ of lever 15 projects over and in line with shaft 1, in position to be operated by a reciprocative sleeve 17, that is adapted to slide under the lever 15 and move it on its pivot to cause the arm 15ª of said lever to actuate the friction-arm 5ᵉ. The sleeve 17 is mounted to slide upon the sleeve or hub 3, and I have shown the levers 15 as provided with adjustable contact-pieces 18, shown in the form of screws, adapted to be engaged by the sleeve 17, the operative end 17ª of sleeve 17 being preferably beveled or rounded to slide freely under the parts 18. The sleeve 17 is shown provided with an annular groove 17ᵇ, which may receive a fork or other well-known device for sliding the sleeve toward and from the arms 15. When the sleeve 17 is pushed under the arms 15, the latter will cause the friction-arms 5ᵉ to engage the rim 9ª of drum 9 by frictional contact, whereby sleeve 3, disk or extension 5, and drum 9 will be locked firmly together; but the parts 5 and 9 can move relatively to each other if undue strain arises owing to the slipping of the friction devices.

Any suitable means may be provided for keeping the drum 9 from rotating, so that the slow speed of wheel 2, hereinbefore described, can be produced. I find it convenient to use a brake for this purpose, and I have shown a brake-band 20 as encircling the drum 9, which brake-band is shown pivotally connected at its ends with a lever 21, and the pivot or fulcrum 22 of said lever is located between the points of connection of the brake-band with the lever. (See Fig. 3.) The pivot or fulcrum for this lever may be supported in any suitable manner. (Not necessary to illustrate.) By preference the brake-band 20 enters an annular groove 23 in the periphery of rim 9ª of drum 9 to keep the band in position upon the drum. It will be understood that by moving the lever 21 in the direction of the arrow in Fig. 3 the brake can be applied to drum 9 to the degree of brake-pressure desired.

The devices I have shown for rotating the wheel 2 in a direction reverse to the direction of rotation of shaft 1 are as follows: Upon shaft 1 is firmly mounted a gear 25, shown provided with a hub 25ª and secured to the shaft, as by a key 26. From the end of sleeve 3 adjacent to gear 25 a drum, disk, or extension 27 extends, which is immovably secured to said sleeve, being shown made integral therewith, and the rim 27ª extends substantially parallel with shaft 1. 28 is a rack secured within the rim 27ª, as by screws or the like 29, and 30 represents pinions in mesh with the gear 25 and with rack 28 in manner substantially similar to that shown in Fig. 3. The pinions 30 are mounted to rotate upon studs or shafts 31 in manner similar to the pinions 13, which studs or shafts 31 are shown secured to and projecting from a drum, disk, or the like 32, mounted to freely rotate around shaft 1, being shown journaled upon hub 25ª of gear 25, the rim 33 projecting substantially parallel with shaft 1. A collar 34, secured on shaft 1, keeps said drum in position relative to gear 25. The disk or drum 32 is to be held from rotation when the wheel 2 is to rotate in a direction reverse to the direction of rotation of shaft 1, and for this purpose I preferably provide a brake in the form of a band 35, that enters a groove 36 in the periphery of rim 33, which brake-band may be operated by a lever in manner substantially similar to that shown in Fig. 3 with reference to brake-band 20. When the brake is applied to drum 32, the pinions 30 are held from being carried around shaft 1, and thereby as gear 25 is rotated by said shaft the pinions 30 will be rotated on their axes and by their engagement with rack 28 will cause the latter to rotate around shaft 1, thereby carrying drum or disk 27 around with it, whereupon sleeve 3 and wheel 2 will be rotated reversely to the direction of rotation of shaft 1.

Sometimes, particularly in case of emergency, it may be desirable to prevent the rotation of wheel 2. For this purpose I preferably provide a brake-band 37, adapted to act upon the rim 27ª of drum 27, which brake-band may be arranged in connection with a lever in manner substantially similar to that shown in Fig. 6 with respect to brake-band 20, and the periphery of rim 27ª is shown provided with an annular groove 38 to receive the band 37.

The complete operation of my improvements may be described as follows: When it is desired to rotate wheel 2 at the high speed, shaft 1 is rotated and sleeve 17 is moved to cause the friction-clutches to firmly connect disk 5 with drum 9, whereupon as pinions 13 cannot travel around rack 11 independently thereof they will be locked to said rack, and thereby drum 9, rack 11, pinions 13, gear 7, shaft 1, disk 5, sleeve 3, wheel 2, and drum 27 will all rotate in the same direction and at the same speed as shaft 1. As rack 28 is thus carried around with drum 27 it will act upon pinions 30 to cause them to rotate, and drum 32 can rotate freely, as there will be no interference between the parts 28, 30, and 35. If it is desired to rotate wheel 2 at a relatively slower speed than shaft 1, but in the same direction, the friction devices are not connected with drum 9, but brake-band 20 is applied to said drum to keep the latter from rotating. As gear 7 now rotates with shaft 1 pinions 13 will be rotated on their axes, and as they are in mesh with rack 11 they will be caused to travel around the same, and thereby rotate disk 5 at a speed lower than the rotation of shaft 1 in the same direction as the latter, whereupon sleeve 3 and wheel 2 will be correspondingly rotated. Rack 28, pinions 30, and gear 25 will coact freely, as described before with relation to the rotation of wheel 2 at the high speed. When it is desired to rotate wheel 2 in a reverse direction, the brake-band 35 is applied to rim 33 of drum 32 to keep the latter from rotation, and as shaft 1 is now rotating in the same direction as before gear 25 will cause pinions 30 to rotate, and as said pinions are in mesh with rack 28 the latter will be caused to rotate in a direction reverse to the direction of rotation of shaft 1, whereupon drum 27, sleeve 3, and wheel 2 will also rotate in the last-mentioned direction, but at a speed slower than the rotation of shaft 1. During this operation disk 5 will be rotated and will carry pinions 13 around with it, and as said pinions are in mesh with gear 7 and with rack 11 they will be rotated on their axes; but as drum 9 is free to rotate around shaft 1 rotary motion will be communicated to it through said pinions 13 and rack 11 without any interference. When it is desired to keep wheel 2 from rotating while shaft 1 continues to rotate, the brake-band 37 is applied to rim $27^a$ of drum 27, whereupon sleeve 3, wheel 2, and disk 5 are held from rotation, and as gears 7 and 25 now rotate with shaft 1 the corresponding pinions 13 and 30 will be rotated on their axes, and this rotation of pinions 13 will cause drum 9, through the medium of rack 11, to rotate freely, pinions 30 will travel around rack 28, and drum 32 will then be free to rotate around shaft 1, so that all the parts not immediately held stationary by brake-band 27 can rotate freely and without any interference. It is evident that I can omit the use of the brake-band 37 and apply a brake to the part driven by wheel 2 in any suitable manner.

My improved gearing will be particularly useful in vehicles for transmitting variable speeds from a motor to driving-wheels.

I do not limit my invention to the details of construction and arrangement shown and described, as they may be varied without departing from the spirit thereof.

Having now described my invention, what I claim is—

1. The combination of a driving part, a driven part, a sleeve mounted to rotate around the driving part and to which the driven part is connected, a rack mounted to rotate around the driving part, means to limit rotation of said rack, a gear in mesh with said rack, means for communicating independent rotation from the driving part to said gear, means to lock said rack to the driving and driven parts, means connecting said gear with said sleeve to actuate the latter and the driven part by the movement of said gear along said rack, a rack rigidly connected with the driven part, means to limit rotation of said rack, gearing connecting the driving part with said rack, a rotative member carrying part of said gearing, and means to limit rotation of said member, substantially as described.

2. The combination of a driving part, a driven part, a rack independent of the driven part mounted to rotate around the driving part, gearing connecting the driving part with the driven part and with said rack, means for locking the driven part to said rack independent of the gearing, a rack rigidly connected with the driven part, and means operated by the driving part to rotate said rack, substantially as described.

3. The combination of a driving part, a driven part, a rack independent of the driven part mounted to rotate around the driving part, gearing connecting the driving part with the driven part and with said rack, means to limit rotation of said rack, means for locking the driven part direct to said rack, a rack rigidly connected with the driven part, and means operated by the driving part to rotate said rack, substantially as described.

4. The combination of a driving part, a driven part, a member mounted to rotate freely around the driving part, a rack carried by said member, a gear carried by the driving part, a pinion in mesh with said rack and gear, means rigidly connected to the driven part for supporting said pinion, means independent of the gearing for locking the driven part to said member, a rack rigidly connected with the driven part, and means operated by the driving part to rotate said rack, substantially as described.

5. The combination of a driving part, a driven part, a member mounted to rotate freely around the driving part, a rack carried by said member, a brake to control the rotation of said member, a gear carried by the driving part, a pinion in mesh with said rack and gear, means rigidly connected to the driven part for supporting said pinion, friction devices for connecting the driven part with said member independent of the gearing, a rack rigidly connected with the driven part, and means operated by the driving part to rotate said rack, substantially as described.

6. The combination of a driving part, a driven part mounted to rotate around the driving part, a drum mounted to rotate around the driving part, a rack carried by said drum, means to limit the rotation of said drum, a gear carried by the driving part, a pinion in mesh with said gear and said rack, means for supporting said pinion rigidly connected with said driven part, means independent of the gearing for connecting said driven part with said drum, a rack rigidly connected with the driven part, and means operated by the driving part to rotate said rack, substantially as described.

7. The combination of a driving part, a sleeve mounted to rotate around the driving part, a driven part carried by said sleeve, a drum mounted to rotate around said driving part, a rack carried by said drum, means to limit rotation of said drum and rack, a gear, a pinion in mesh with said gear and said rack, said sleeve having an extension for supporting said pinion, means carried by said extension to lock the latter to said drum, a rack rigidly connected with the driven part, and means operated by the driving part to rotate said rack, substantially as described.

8. The combination of a driving part, a driven part, gearing comprising a rack and gears connecting the driving part with the driven part so they will rotate in the same direction, means to limit rotation of said rack, means for locking said rack in connection with the driving and driven parts, and gearing connecting the driving part with the driven part independent of the first-mentioned gearing to rotate the driven part in a direction reverse to the direction of rotation of the driving part, substantially as described.

9. The combination of a driving part, a driven part, gearing comprising a rack and gears connecting the driving part with the driven part, means to limit rotation of said rack, means for locking said rack in connection with the driving and driven parts, other gearing connecting the driving part with the driven part independent of the first-mentioned gearing to rotate the latter in a direction reverse to the direction of rotation of the driving part, and means for limiting the rotation of part of said gearing around the driving part, substantially as described.

10. The combination of a driving part, a driven part, gearing having a rack and gears connecting the driving part with the driven part, means for locking said rack to the driving and driven parts, a rack connected with said driven part independent of said gearing, a gear connected with said driving part, a pinion interposed between said rack and gear, a support for said pinion mounted to rotate around the driving part, and means to limit rotation of said support, substantially as described.

11. The combination of a driving part, a driven part, gearing having a rack and gears connecting the driving part with the driven part, and means for locking said rack to the driving and driven parts, with a rack connected with the driven part independent of the gearing, a gear connected with the driving part, a pinion interposed between said rack and gear, a member carrying said pinion and mounted to rotate around the driving part, and a brake to limit rotation of said member, substantially as described.

12. The combination of a driving part, a driven part, a pinion connected therewith, means for rotating said pinion by the driving part, a rack independent of the driven part to coact with said pinion, means to limit rotation of said rack, a rack rotative independently of the first-mentioned rack, means coacting with the driving part and the second-mentioned rack to rotate the driven part, and means to connect the first-mentioned rack with the driving and the driven parts through the gearing to rotate them together, substantially as described.

13. The combination of a driving part, a driven part, two epicycloidal trains of gearing for rotating the driven part by the driving part, each train comprising an inner element in the form of a gear, an outer element in the form of a rack, and the intermediate elements in the form of pinions, said racks being rotative independently of each other, means to limit the rotation of each of said racks independent of the driven part, means for causing said intermediate elements to rotate said driven part, means for locking the driving part in connection with the driven part through the gearing, a brake rim or drum connected with the driven part, and a brake to coact with the rim or drum, substantially as described.

14. The combination of a driving part, a support mounted to rotate therearound, a rack rigidly carried by said support, a brake to limit rotation of said rack, gearing connecting said driving part with said rack, a driven part, part of said gearing being connected with said driven part to rotate therewith, a rack firmly connected with said driven part, gearing connecting said driving part with said rack, a member rotative independently of the driving part and carrying part of said gearing, means to limit rotation of said member, and means to cause the driving and the driven parts to be locked in connection with each other, substantially as described.

15. The combination of a driving part, a support mounted to rotate therearound, a rack rigidly carried by said support, a brake to limit rotation of said rack, gearing connecting the driving part with said rack, a driven part, part of said gearing being connected with said driven part to rotate therewith, a rack firmly connected with said driven part, gearing connecting said driving part with said rack, a member rotative independently of the driving part and carrying part of said gearing, means to limit rotation of said member, means to cause the driving and the driven parts to be locked in connection with each other, a brake rim or drum connected with said driven part, and a brake to coact with said rim or drum, substantially as described.

16. The combination of a shaft, a support mounted to rotate therearound, a rack rigidly carried by said support, a brake to limit rotation of said rack, gearing connecting said driving part with said rack, a driven part mounted to rotate around said shaft, a support connected with said driven part, part of said gearing being carried by said support, another support connected with said driven part, a rack firmly connected with the last-named support, gearing connecting said shaft with said rack, a member mounted to rotate around said shaft, part of said gearing being carried by said member, a brake to limit rotation of said member, and means for causing said shaft and said driven part to be locked in connection with each other, substantially as described.

17. The combination of a shaft, a support mounted to rotate therearound, a rack rigidly carried by said support, a brake to limit rotation of said rack, gearing connecting said driving part with said rack, a driven part mounted to rotate around said shaft, a support connected with said driven part, part of said gearing being carried by said support, another support connected with said driven part, a rack firmly connected with the last-named support, gearing connecting said shaft with said rack, a member mounted to rotate around said shaft, part of said gearing being carried by said member, a brake to limit rotation of said member, means for causing said shaft and said driven part to be locked in connection with each other, a brake rim or drum connected with said driven part, and a brake to coact with said rim or drum, substantially as described.

18. The combination of a driving part, a driven part, gearing comprising a rack and gears connecting the driving part with the driven part so that they will rotate in the same direction, means to limit rotation of said rack, means for locking said driven part in connection with said rack, and gearing having a rack rotative independently of the first-mentioned rack connecting the driving part with the driven part to rotate the latter in a direction reverse to the direction of rotation of the driving part, substantially as described.

19. The combination of a driving part, a driven part, gearing comprising a rack and gears connecting the driving part with the driven part, means for locking said driven part in connection with said rack, other gearing having a rack rotative independently of the first-mentioned rack connecting the driving part with the driven part to rotate the latter in a direction reverse to the direction of rotation of the driving part, and means for limiting the rotation of part of said gearing around the driving part, substantially as described.

20. The combination of a driving part, a driven part, gearing comprising a rack and gears connecting the driving part with the driven part, means for locking said rack in connection with the driven part, a rack firmly connected with said driven part, a gear connected with said driving part, a pinion in mesh with said rack and gear, a support for said pinion mounted to rotate around the driving part, and means to limit rotation of said support, substantially as described.

21. The combination of a driving part, a driven part, gearing comprising a rack and gears connecting the driving part with the driven part, means to limit rotation of said rack, and means for locking said rack in connection with the driven part, with a rack firmly connected with the driven part, a gear connected with the driving part, a pinion in mesh with said rack and gear, a member carrying said pinion and mounted to rotate around the driving part, and a brake to limit rotation of said member, substantially as described.

22. The combination of a driving part, a driven part, gearing connecting the driving part with the driven part, means for locking said driving part in connection with the driven part through the gearing, gearing connecting the driving part with the driven part to rotate the latter in a direction reverse to the direction of rotation of the driving part, a drum connected with the driven part, and a brake to limit rotation of said drum, substantially as described.

COLCORD UPTON.

Witnesses:
T. F. BOURNE,
F. E. TURNER.